US011116612B2

(12) United States Patent
Chou

(10) Patent No.: US 11,116,612 B2
(45) Date of Patent: Sep. 14, 2021

(54) METHOD FOR MAKING A SET OF DENTURES

(71) Applicant: Jang-Ching Chou, San Antonio, TX (US)

(72) Inventor: Jang-Ching Chou, San Antonio, TX (US)

(*) Notice: Subject to any disclaimer, the term of this patent is extended or adjusted under 35 U.S.C. 154(b) by 270 days.

(21) Appl. No.: 16/524,125

(22) Filed: Jul. 28, 2019

(65) Prior Publication Data

US 2020/0038153 A1  Feb. 6, 2020

Related U.S. Application Data

(60) Provisional application No. 62/712,971, filed on Jul. 31, 2018.

(51) Int. Cl.
| A61C 13/00 | (2006.01) |
| A61C 13/20 | (2006.01) |
| A61C 19/05 | (2006.01) |
| A61C 9/00  | (2006.01) |

(52) U.S. Cl.
CPC ............ *A61C 13/20* (2013.01); *A61C 9/0006* (2013.01); *A61C 19/05* (2013.01)

(58) Field of Classification Search
CPC ......... A61C 13/20; A61C 9/0006; A61C 9/00; A61C 19/05; A61C 13/0004; A61C 13/0006; A61C 13/01; A61C 13/34
See application file for complete search history.

(56) References Cited

U.S. PATENT DOCUMENTS

| 4,345,900 A * | 8/1982 | Katz ........................ A61C 9/00 433/171 |
| 5,961,325 A * | 10/1999 | Van Handel ......... A61C 9/0006 433/213 |
| 6,224,375 B1 | 5/2001 | Diasti et al. |
| 6,315,555 B1 * | 11/2001 | Bortolotti ............ A61C 9/0006 433/37 |
| 2014/0356806 A1 * | 12/2014 | Liebman ................ A61C 9/002 433/37 |
| 2015/0132718 A1 * | 5/2015 | Kerschensteiner .. A61C 13/082 433/196 |

* cited by examiner

Primary Examiner — Nicholas D Lucchesi
(74) Attorney, Agent, or Firm — Louis Ventre, Jr.

(57) ABSTRACT

A method for making a set of dentures comprises a providing step, a mandibular impressing step, a first maxillary impressing step, a tray fabricating step, a second maxillary impressing step, a bite registering step, and a denture fabricating step. Optionally, the method further includes a bending step, a lifting step, a posterior molding step, a removing step, and/or an anterior molding step.

4 Claims, 21 Drawing Sheets

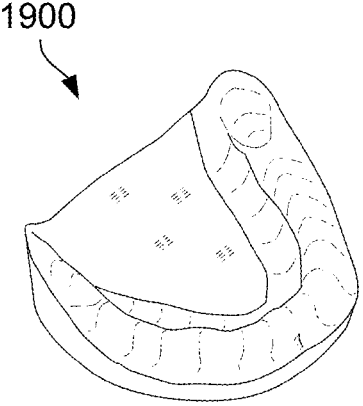 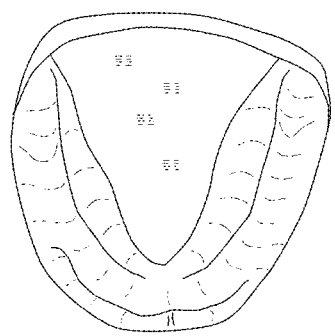
FIG.19  FIG.20
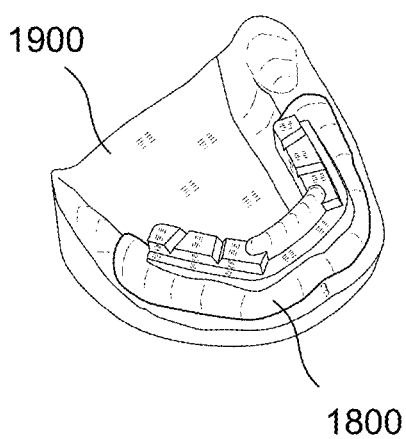 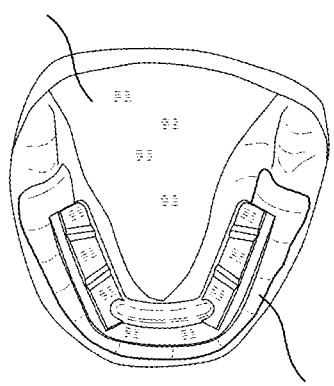
FIG.21  FIG.22

METHOD FOR MAKING A SET OF DENTURES

CROSS-REFERENCE TO RELATED APPLICATION

This application claims the benefit of U.S. Provisional Application No. 62/712,971, filed 31 Jul. 2018, which is hereby incorporated by reference herein.

TECHNICAL FIELD

In the field of dentistry, a method is disclosed for making a dental prostheses utilizing one impression of the mandibular jaw and sequential impressions of the maxillary jaw, resulting in a set of dentures.

BACKGROUND ART

Dentures are a remedial prosthetic that replace natural teeth that have been lost by the patient. Currently, multiple visits to a dental office are required to fabricate a set of dentures for a patient. In addition, the methods used are prone to create errors in the measurement, angulation, occlusion, and placement of dentures.

The process of making dentures is typically done by a qualified and licensed dental practitioner and often requires up to 5 dental appointments on different days for taking appropriate molds, sending the same to a lab, and then fitting the same into the patient's mouth. This is time consuming and the multiple day appointments often result in compromised quality of the dentures.

Others have proposed magnetic devices with wax melting steps to reduce the preparation time to 1 office visit such as patent publication 20140356806. This publication explains that the trays having platforms or support surfaces which magnetically hold a main frame. No magnetic devices or wax melting steps are required using the present methods.

SUMMARY OF INVENTION

A method is provided for fabricating a set of dentures for a patient. The method includes the steps of: providing a first mandibular tray and a first maxillary tray; depositing a first impression material to a first mandibular tray bottom surface; pressing the first impression material against a mandibular gum of the patient and setting the first impression material; depositing a second impression material to a first maxillary tray top surface; pressing the second impression material against a maxillary gum of the patient and setting the second impression material; fabricating a second mandibular tray on the basis of the first impression material and fabricating a second maxillary tray on the basis of the second impression material; depositing a third impression material to a second maxillary tray top surface; pressing the third impression material against the maxillary gum of the patient and setting the third impression material; thereafter depositing a bite registration material between a second maxillary tray bottom surface and a second mandibular tray top surface, and having the patient bite down; fabricating the set of dentures on the basis of the second maxillary tray, the third impression material, the second mandibular tray, and the bite registration material. Preferably, no impression material is deposited on a second mandibular tray bottom surface.

In some implementations, the second maxillary tray may include at least one tooth form. In some implementations, the at least one tooth form may be a premolar tooth form, and in some embodiments, the premolar tooth form may include no lingual cusp.

In some implementations, the method may additionally include the steps of: disposing a lifting piece over a first mandibular tray bottom surface; depositing a first molding material over a posterior portion of the first mandibular tray bottom surface and molding the first molding material to the mandibular gum of the patient; thereafter removing the lifting piece; and/or depositing a second molding material over an anterior portion of the first mandibular tray bottom surface and molding the second molding material to the mandibular gum of the patient.

Technical Problem

Current denture fabrication procedures take too long to complete and can result in dentures that are ill fitting.

It is a major problem in the field of dentistry that maxillary trays used for taking a bite registration are not stable. Oftentimes, denture adhesive needs to be used during bite registration because of how unstable the maxillary trays are.

Advantageous Effects of Invention

Making a set of dentures typically takes 5 appointments. Using the disclosed method, a set dentures can be made with decreased total treatment time, increased accuracy of occlusion, and/or improved fit over currently available methods.

The method eliminates the use of impression material deposited on a second mandibular tray bottom surface. This has several advantageous effects.

Firstly, it improves the fit of the dentures by enabling an intimate fit between the second mandibular tray and a mandibular model.

Secondly, there is a diminished chance of occlusal interference when the patient bites down during bite registering. Bite registration accuracy is improved due to the minimization of spill over registration material being deposited on the second mandibular tray bottom surface.

Thirdly, a vertical dimension of occlusion is easier to determine, since impression material increases the distance between the maxillary gum and the mandibular gum of the patient.

The method described herein alleviates the stability problem by obtaining bite registration following taking the impression of the maxillary gum. This allows a second maxillary tray to be stabilized by an added impression material.

In some implementations, the use of a second maxillary tray includes the tooth form that enables the clinician to visualize teeth within the mouth of the patient and provides a state in which the second maxillary tray is made stable by a third impression material.

BRIEF DESCRIPTION OF DRAWINGS

The drawings illustrate preferred embodiments of a bendable impression tray according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

FIG. 19 is a top right perspective view of a mandibular model.

FIG. 20 is a top view of the mandibular model of FIG. 19.

FIG. 21 is the top right perspective view of FIG. 19 showing the second mandibular tray being disposed on the mandibular model.

FIG. 22 is the top view of FIG. 20 showing the second mandibular tray being disposed on the mandibular model.

DESCRIPTION OF EMBODIMENTS

Figure 1:
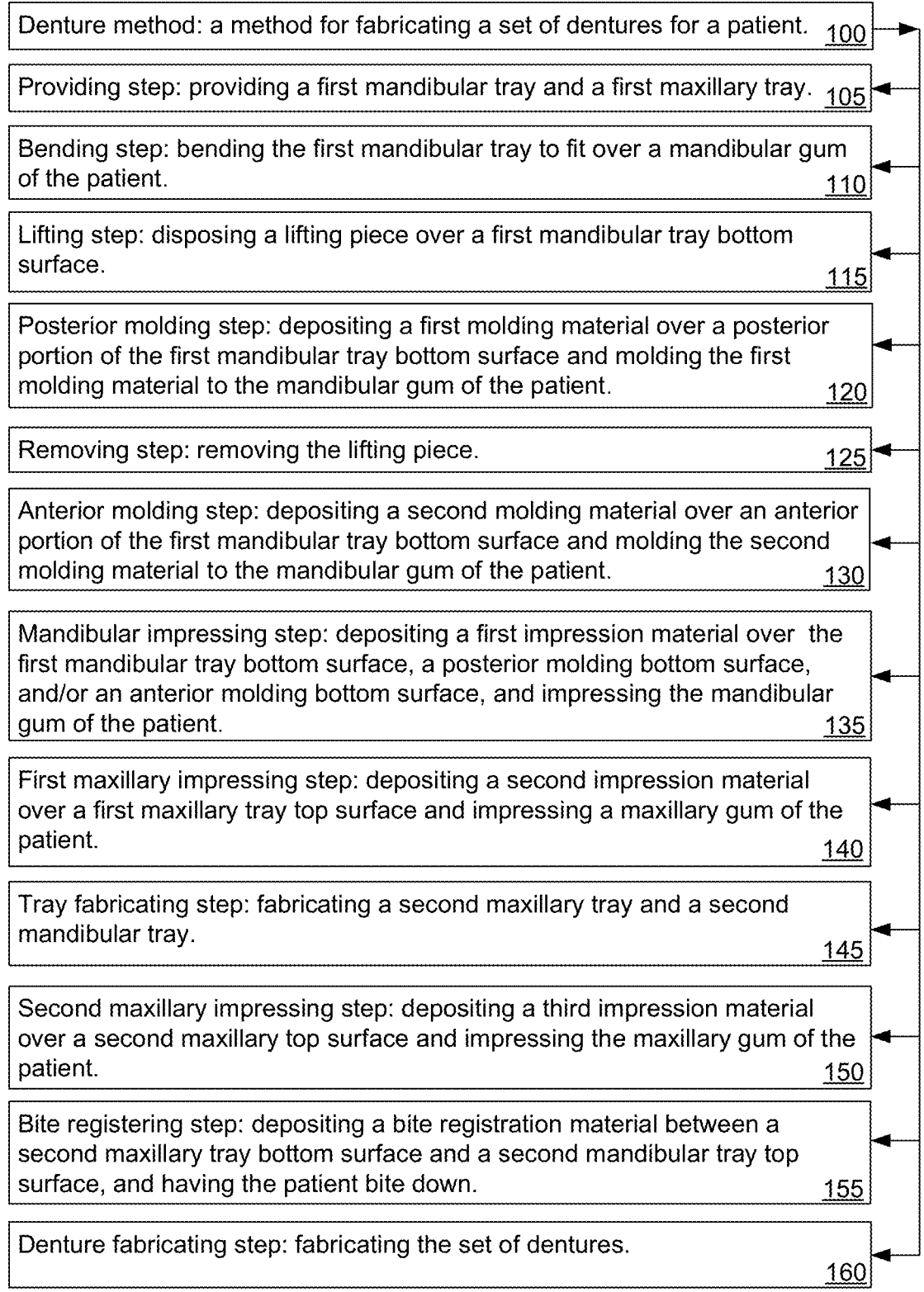
FIG. 1 is a flow chart illustrating a method for making a set of dentures.
Figure 2:
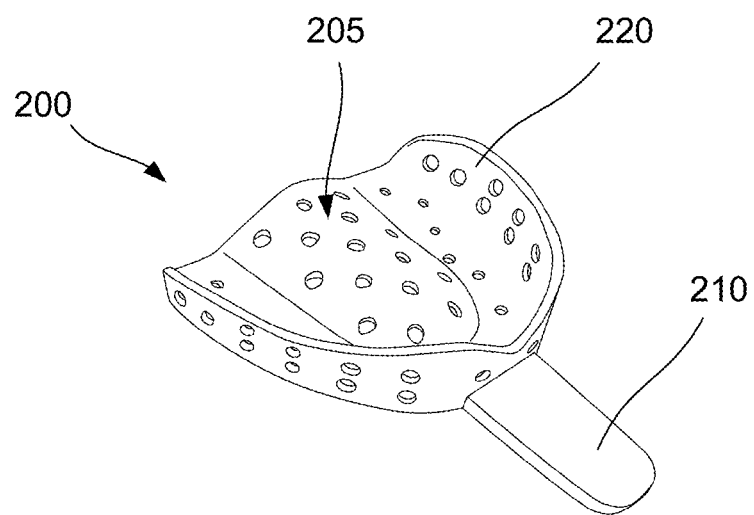
FIG. 2 is a top right perspective view of a first maxillary tray.
Figure 3:
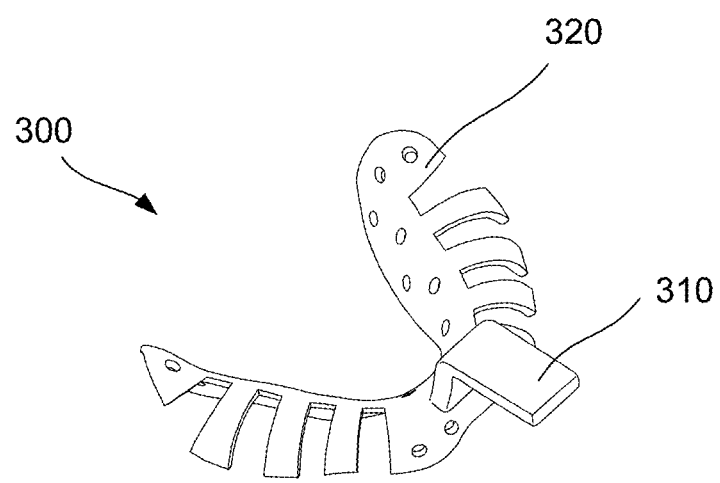
FIG. 3 is a top right perspective view of a first mandibular tray.

In the following description, the term "denture" may be a removable complete denture or an implant supported fixed denture, and may be made using any material(s) and/or methods known in the art. For example, the denture may be made, at least in part, of an acrylic (such as polymethyl methacrylate), a resin (such as composite resin), a metal (such as titanium), a ceramic (such as lithium disilicate), zirconia, and the like.

Throughout this description, the term "clinician" may be any individual who facilitates making of the set of dentures. For example, the clinician may be a dentist, a dental assistant, a dental technician, an auxiliary personnel, the patient, a friend or family member of the patient, and the like.

A method for making a set of dentures for a patient is disclosed. The method, also referred to as a denture method (100), includes a providing step (105), a mandibular impressing step (135), a first maxillary impressing step (140), a tray fabricating step (145), a second maxillary impressing step (150), a bite registering step (155), and a denture fabricating step (160). The set of dentures includes a maxillary denture and a mandibular denture.

Optionally, the denture method (100) may additionally include, for example, a bending step (110), a lifting step (115), a posterior molding step (120), a removing step (125), and/or an anterior molding step (130).

The providing step (105) is providing a first mandibular tray (300) and a first maxillary tray (200). The first maxillary tray (200) may be any tray suitable for taking an impression of a maxillary jaw of the patient. The maxillary jaw of the patient may be completely edentulous. The first maxillary tray (200) preferably includes a first maxillary tray base portion (220) and a first maxillary tray handle portion (210). The first maxillary tray base portion (220) is contoured to fit over the maxillary jaw of the patient, and provide a suitable amount of space for impression material to be disposed between the maxillary jaw of the patient and the first maxillary tray base portion (220).

The first mandibular tray (300) preferably includes a first mandibular tray base portion (320) and a first mandibular tray handle portion (310). The first mandibular tray base portion (320) is contoured to fit over a mandibular gum (600) of the patient. The first mandibular tray base portion (320) provides a suitable amount of space for impression material to be disposed between the mandibular gum (600) of the patient and the first mandibular tray base portion (320). The mandibular gum (600) of the patient may be completely edentulous.

Throughout this description, the term "completely edentulous" refers to a state of being completely without teeth. It will be understood that the term "edentulous" and/or "completely edentulous" does not preclude having one or more implants, such as titanium dental implants.

Figure 4A:
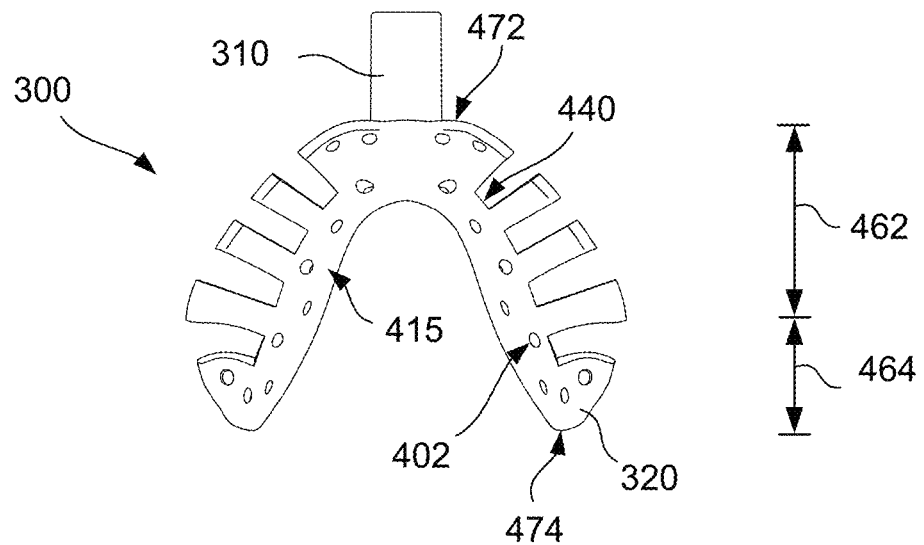
FIG. 4A is a bottom view of the first mandibular tray of FIG. 3.

As shown in FIG. 4A, the first mandibular tray base portion (320) includes a first mandibular tray bottom surface (415), an anterior end (472) and a posterior end (474).

As shown in FIG. 4A, the first mandibular tray bottom surface (415) includes an anterior portion (462) and a posterior portion (464). The anterior portion (462) is defined as an anterior 60% of the first mandibular tray bottom surface (415), and the posterior portion (464) is defined as a portion of the first mandibular tray bottom surface (415) being posterior to the anterior portion (462). That is, the posterior portion (464) is defined as a posterior 40% of the first mandibular tray bottom surface (415).

Figure 4B:
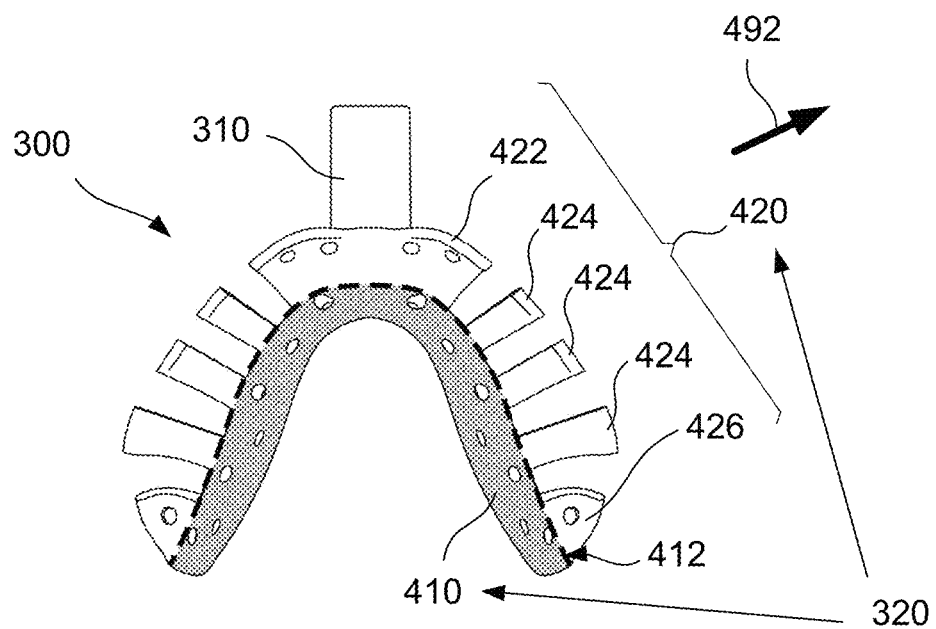
FIG. 4B is the bottom view of FIG. 4A showing location of a U shaped portion.

As shown in FIG. 4B, the first mandibular tray base portion (320) may include a U shaped portion (410), and optionally at least one of the buccal extension (420). The U shaped portion (410), when present, is substantially U shaped in bottom view. Throughout this description, the term "substantially U shaped" describes a U shape which may define notches or apertures. For example, the U shaped portion (410) may define at least one aperture (402). The buccal extension (420), when present, extends outwardly from a buccal side (412) of the U shaped portion (410). In FIG. 4B, the buccal side (412) is shown in thick broken line.

Figure 5:
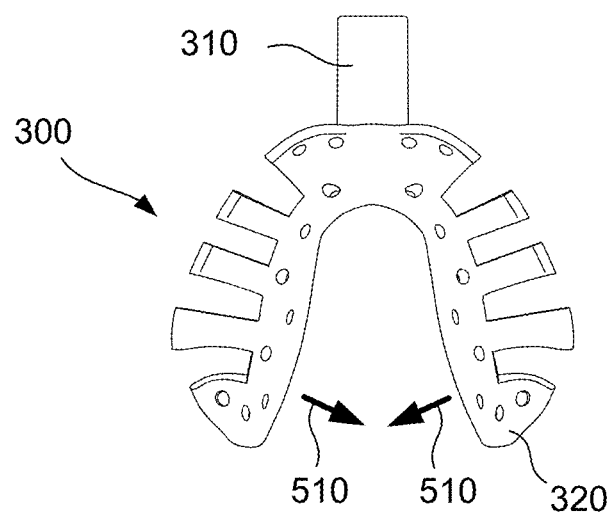
FIG. 5 is a bottom view of the first mandibular tray showing the first mandibular tray being bent inwardly.

For example, the buccal extension (420) may extend buccally (492) by, e.g. at least 5 millimeters, or more preferably by e.g. at least 10 millimeters, serving to allow the first mandibular tray base portion (320) to be bent, inwardly or outwardly to accommodate the size of the mandibular gum (600) of the patient. This is shown in FIG. 5, which shows the first mandibular tray base portion (320) being bent inwardly. An inward direction (510) is shown in thickened arrow.

The buccal extension (420) may be an anterior extension (422), extending outwardly from an anterior region of the U shaped portion (410). The buccal extension (420) may be a posterior extension (424), extending outwardly from a premolar to molar region of the U shaped portion (410). The buccal extension (420) may be a retromolar projection (426), extending buccally (492) from a retromolar region of the U shaped portion (410).

Throughout this description, the term "anterior region" refers to an area corresponding to an anterior tooth area (that is, incisor to canine) of a mouth when anterior teeth had been present.

Throughout this description, the term "posterior region" refers to an area corresponding to a posterior tooth area (that is, premolar to molar) of the mouth when posterior teeth had been present.

Throughout this description, the term "retromolar region" refers to an area posterior to a second molar tooth when the second molar tooth had been present.

In other words, as shown in FIG. 4A, the first mandibular tray base portion (320) may define one or more buccal notch (440) inwardly extending from a buccal side (not marked) of the first mandibular tray base portion (320). The buccal notch may be, e.g. at least 5 millimeters, and more preferably at least 10 millimeters, serving to allow for the first mandibular tray base portion (320) to be bent, inwardly or outwardly to accommodate the size of the mandibular gum (600) of the patient.

It will be understood that the first mandibular tray (300) may also take other configuration(s). For example, as shown in FIG. 37, the first mandibular tray base portion (320) may be substantially U shaped in bottom view, not defining any buccal notch (440).

The first mandibular tray (300) may be either mass produced or custom made to fit the mandibular gum (600) of the patient.

Although, as described above, the first mandibular tray (300) preferably includes the buccal extension (420), enabling the first mandibular tray (300) to be bent, it will be understood that, in some implementations, the first mandibular tray (300) may also be a conventionally formed mandibular impression tray. This is shown in FIG. 37, which shows the first mandibular tray (300) having no buccal extension (420).

Figure 37:
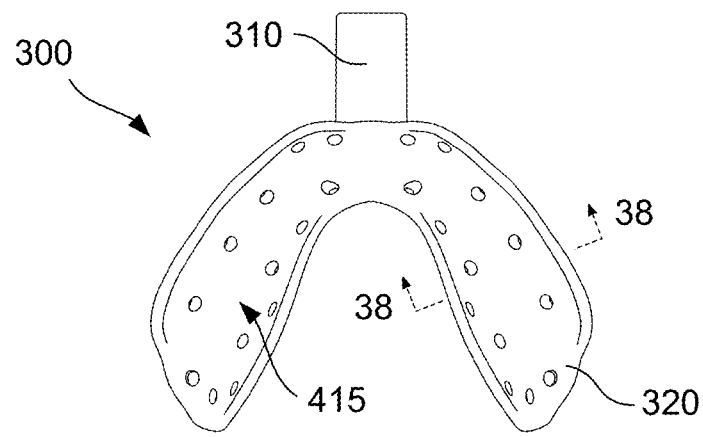
FIG. 37 is a bottom view of an embodiment of the first mandibular tray having no buccal notch according to the embodiment of FIG. 4A.
Figure 38:
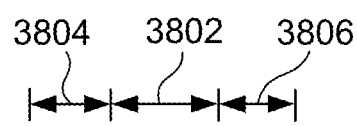
FIG. 38 is a cross sectional view through section line 38-38 of FIG. 37.
Figure 38:
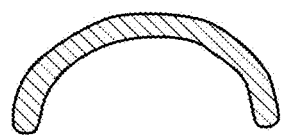
Figure 39:
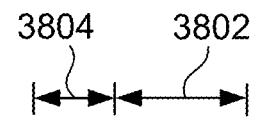
FIG. 39 is a cross sectional view of the first mandibular tray having no first mandibular tray base portion buccal portion according to the embodiment of FIG. 38.
Figure 39:
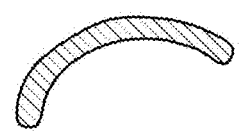

For example, as shown in FIG. 38, which is a cross-sectional view through section line 38-38 of FIG. 37, the first mandibular tray base portion (320) may include a first mandibular base middle portion (3802), a first mandibular base lingual portion (3804), and a first mandibular base buccal portion (3806).

The first mandibular base middle portion (3802) is substantially U shaped in bottom view (not shown). The first mandibular base lingual portion (3804) extends downwardly from a lingual side of the first mandibular base middle portion (3802) with slope of more than 10 degrees. The first mandibular base buccal portion (3806), when present, extends downwardly from a buccal side of the first mandibular base middle portion (3802) with slope of more than 10 degrees.

Figure 6:
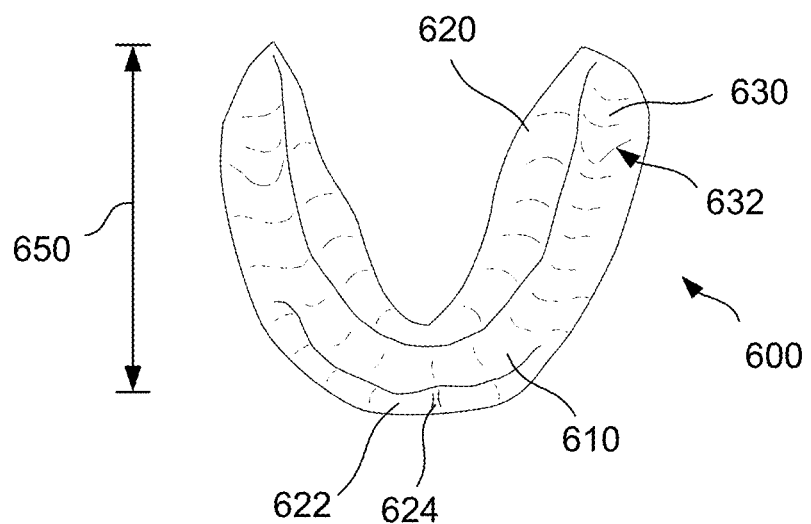
FIG. 6 is a top view of a mandibular gum of a patient.
Figure 7:
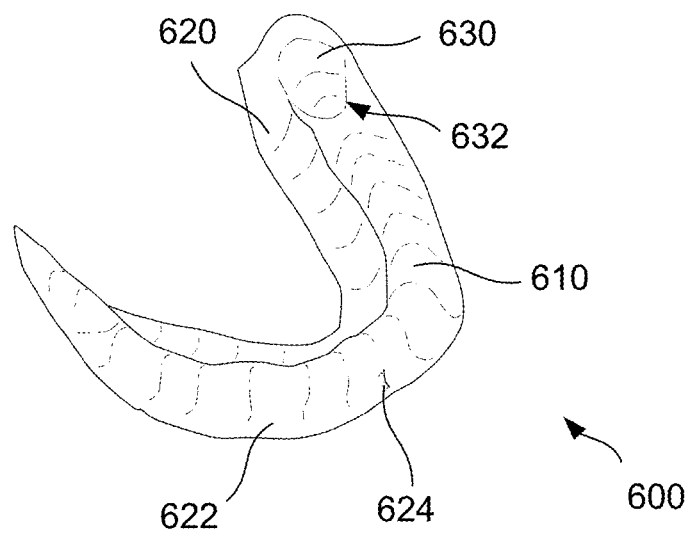
FIG. 7 is a top right perspective view of the mandibular gum of the patient.
Figure 8:
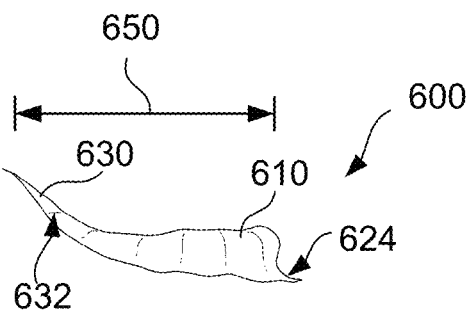
FIG. 8 is a right side view of the mandibular gum of the patient.
Figure 9:
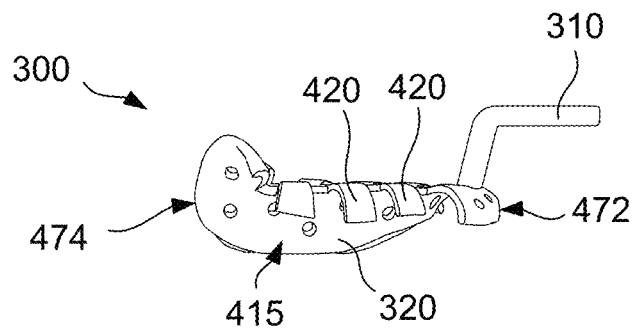
FIG. 9 is a right side view of the first mandibular tray of FIG. 3.

FIG. 6, FIG. 7, and FIG. 8 illustrate different views of the mandibular gum (600) of the patient. The mandibular gum (600) may include a mandibular edentulous ridge (610), a mandibular retromolar pad (630), a mandibular retromolar pad anterior border (632), a mandibular lingual vestibule (620), a mandibular buccal vestibule (622), and/or a mandibular labial frenum (624). The mandibular retromolar pad (630) and the mandibular edentulous ridge (610), when taken together, defines a mandibular ridge length (650). The mandibular ridge length is measured anterior-posteriorly.

Figure 10:
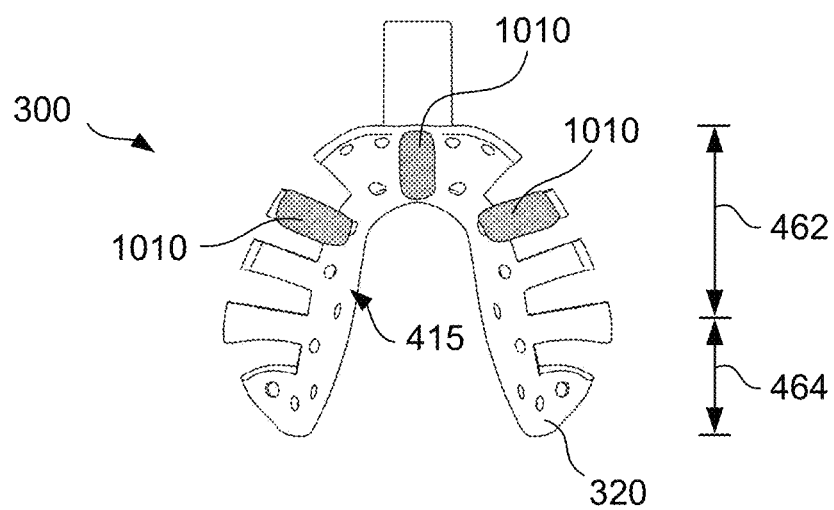
FIG. 10 is a bottom view of the first mandibular tray with lifting pieces being attached.

The lifting step (115) is disposing a lifting piece (1010) over the first mandibular tray bottom surface (415). As shown in FIG. 10, in one implementation, at least one of the lifting piece (1010) may be disposed over the anterior portion (462) of the first mandibular tray bottom surface (415). The lifting piece (1010) may be any suitable material, such as, for example, wax (such as any waxes used by dentists, such as "utility wax"), silicone material such as silicone putty, and the like. The lifting piece (1010) may also be a component removably attached to the first mandibular tray bottom surface (415), such as by a hub-and-receptacle means, a snap fit element, a magnetic element, and the like. As shown in FIG. 10, there may be more than one of the lifting piece (1010), such as 3 of the lifting piece (1010) shown in FIG. 10.

Figure 11:
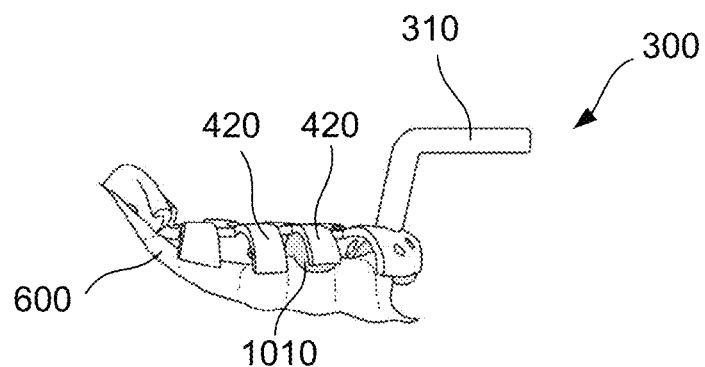
FIG. 11 is a right side view of the first mandibular tray with lifting pieces attached being disposed over the mandibular gum.

As shown in FIG. 11, the lifting piece (1010) may be adapted to fit directly over the mandibular gum (600) of the patient. That is, in cross sectional view (not shown) the lifting piece (1010) may have a bottom surface (not shown) that may be U shaped, being, at least in part, a negative of a cross section of a top surface of the mandibular gum (600), such that the lifting piece (1010) is in contact with the mandibular edentulous ridge (610).

The lifting piece (1010) being disposed in the anterior portion (462) of the first mandibular tray bottom surface (415) serves to provide increased vertical space between the first mandibular tray bottom surface (415) and the mandibular gum (600) of the patient, such that the posterior portion (464) of the first mandibular tray bottom surface (415) does not distort the mandibular gum (600) of the patient. It is a known problem that the mandibular gum (600) of the patient is prone to being distorted by impression trays, leading to inaccurate impressions, and thus leading to ill-fitting prostheses.

Figure 12:
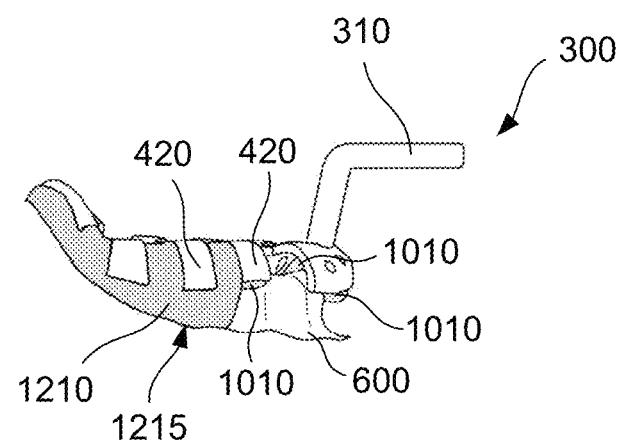
FIG. 12 is a right side view of the first mandibular tray showing a first molding material.

The posterior molding step (120) is depositing a first molding material (1210) over the posterior portion (464) of the first mandibular tray bottom surface (415) and molding the first molding material (1210) to the mandibular gum (600) of the patient. In FIG. 12, the first molding material (1210) is shown as shaded. The first molding material (1210) may be any molding material that can change from a formable state to a rigid state. Suitable molding materials include, but are not limited to: silicone, polyether, polysulfide, dental compound, alginate, wax, and the like.

In the posterior molding step (120), the first molding material (1210) is deposited over the posterior portion (464) of the first mandibular tray bottom surface (415) in the formable state. Prior to the first molding material (1210) reaching the rigid state, the first molding material (1210) is pressed against the mandibular gum (600) of the patient, such that the first molding material (1210) takes a negative form of the mandibular gum (600) of the patient. When the first molding material (1210) is pressed against the mandibular gum (600) of the patient, the first molding material (1210) may be pressed using the first mandibular tray (300) and/or with direct finger pressure.

When the first molding material (1210) is pressed against the mandibular gum (600) of the patient, posterior border molding motions suitable for molding the first molding material (1210) may be performed. The posterior border molding motions may include extending a cheek of the patient upwardly and/or anteriorly, such that the first molding material (1210) is molded to a form corresponding to the cheek of the patient being extended upwardly and/or anteriorly. This prevents the mandibular denture from being over extended with respect to the cheek of the patient, and prevents dislodgement of the mandibular denture.

The removing step (125) is removing the lifting piece (1010). When the lifting piece (1010) is removed from the first mandibular tray bottom surface (415), room is provided between the first mandibular tray bottom surface (415) and the mandibular gum (600), such that molding material and/or impression material may be disposed between the first mandibular tray bottom surface (415) and the mandibular gum (600) without distortion. The lifting piece (1010) being typically more rigid than molding materials and/or impression materials used in dentistry, may be prone to distorting the mandibular gum (600). Thus, removing the lifting piece (1010) advantageously serves to provide a more accurate impression. However, it will be understood that although it is preferable to include the removing step (125), the removing step (125) is optional.

Figure 13:
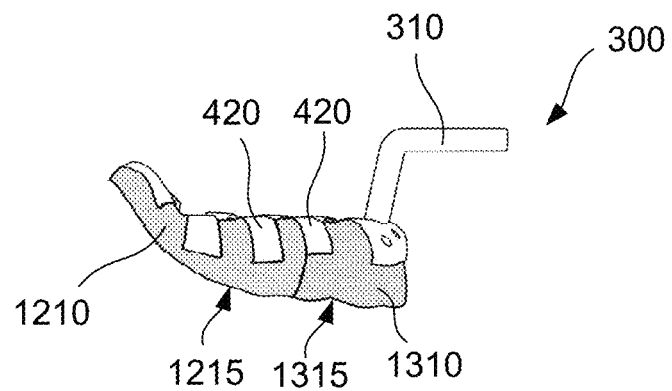
FIG. 13 is a right side view of the first mandibular tray showing a second molding material.

The anterior molding step (130) is depositing a second molding material (1310) over the anterior portion (462) of the first mandibular tray bottom surface (415) and molding the second molding material (1310) to the mandibular gum (600) of the patient. In FIG. 13, the second molding material (1310) is shown as shaded. The second molding material (1310) may be any molding material that can change from a formable state to a rigid state. Suitable molding materials include, but are not limited to: silicone, polyether, polysulfide, dental compound, alginate, wax, and the like.

In the anterior molding step (130), the second molding material (1310) is deposited over the anterior portion (462) of the first mandibular tray bottom surface (415) in the formable state. Prior to the second molding material (1310) reaching the rigid state, the second molding material (1310) is pressed against the mandibular gum (600) of the patient, such that the second molding material (1310) takes a negative form of the mandibular gum (600) of the patient. When the second molding material (1310) is pressed against the mandibular gum (600) of the patient, the second molding material (1310) may be pressed using the first mandibular tray (300) and/or with direct finger pressure.

When the second molding material (1310) is pressed against the mandibular gum (600) of the patient, anterior border molding motions suitable for molding the second molding material (1310) may be performed. The anterior border molding motions may include extending a lower lip of the patient upwardly and/or outwardly, such that the second molding material (1310) is molded to a form corresponding to the lower lip of the patient being extended upwardly and/or outwardly. This prevents the mandibular denture from being over extended with respect to the lower lip of the patient, and prevents dislodgement of the mandibular denture.

Thus, one advantage of the method described above is that the anterior molding motions can be performed following the setting of the first molding material (1210), such that during performance of the anterior molding motions, the first mandibular tray (300) is stable against the mandibular gum (600). That is, for example, the first mandibular tray (300) would not be prone to tipping, for example, anterior-posteriorly or side-to-side during the anterior molding motions. This advantageously allows the second molding material (1310) to more accurately capture an anatomical form of intra-oral anatomic structures, such as the mandibular labial frenum (624), the mandibular buccal vestibule (622), the mandibular edentulous ridge (610), and the like.

It will be understood that the bending step (110), the lifting step (115), the posterior molding step (120), the removing step (125), the anterior molding step (130), and/or any combinations thereof are preferred but not essential. For example, in one implementation, the denture method (100) may include steps of: the providing step (105), the mandibular impressing step (135), the first maxillary impressing step (140), the tray fabricating step (145), the second maxillary impressing step (150), the bite registering step (155), and the denture fabricating step (160). It will also be apparent to those of skill in the art that alternative sequence (s) may be possible. For example, the first maxillary impressing step (140) may come prior to the mandibular impressing step (135).

As shown in FIG. 13, when, for example, the lifting step (115), the posterior molding step (120), the removing step (125), and the anterior molding step (130) are performed, the first molding material (1210) includes a first molding material bottom surface (1215), and the second molding material (1310) includes a second molding material bottom surface (1315).

Figure 40:
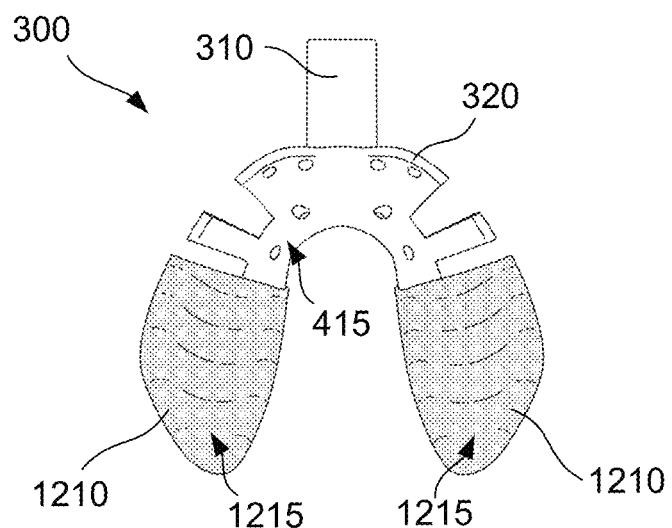
FIG. 40 is a bottom view of the first mandibular tray showing the first molding material.

As shown in FIG. 40, the first molding material (1210) preferably covers at least a portion of the mandibular edentulous ridge (610) and at least a portion of the mandibular retromolar pad (630). That is, the first molding material (1210) is preferably not only disposed in a periphery of the first mandibular tray base portion (320). This advantageously serves for the first mandibular tray (300) to be stable when pressed down within the mouth of the patient. That is, the first mandibular tray (300) would not be prone to, for example, rocking back and forth when the first mandibular tray (300) is pressed down in the mouth of the patient. This is particularly useful since in the anterior molding step (130), the lower lip of the patient will be moved. The first mandibular tray (300) being stabilized by the first molding material (1210) thus allows the second molding material (1310) to be formed such that the mandibular edentulous ridge (610) is accurately molded, while the lower lip of the patient is accurately molded as well.

Another advantage of the first molding material (1210) covering the mandibular edentulous ridge (610) and the mandibular retromolar pad (630) is that a suitable amount of space for molding material is provided for the anterior molding step (130) and the mandibular impressing step (135).

Providing the suitable amount of space is important for the mandibular impressing step (135) to be accurate. Of course, this suitable amount of space is dictated by the height of the lifting piece (1010). For example, the lifting piece (1010) may be between 1 millimeter and 10 millimeters in height (measured from a crest of the mandibular edentulous ridge (610)). If the lifting piece (1010) is less than 1 millimeter in height, then the mandibular gum (600) of the patient would likely be distorted. If the lifting piece (1010) is more than 10 millimeters in height, then there would be too much space for molding material and/or impression material to traverse, which would lead to an inaccurate impression.

Figure 41:
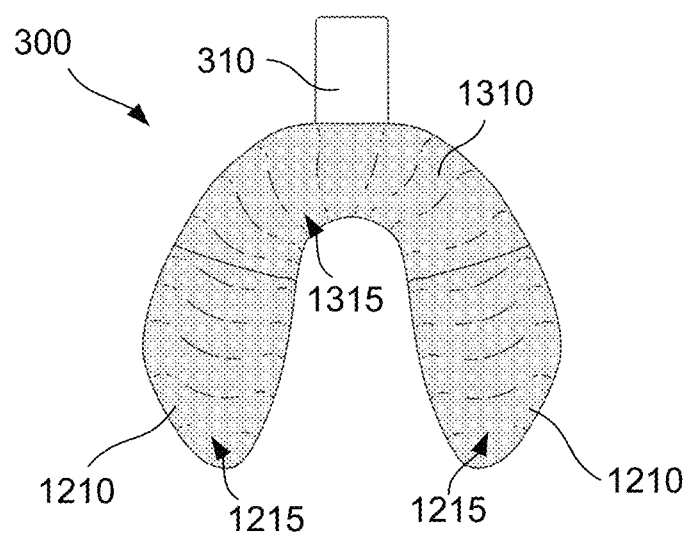
FIG. 41 is a bottom view of the first mandibular tray showing the second molding material.

As shown in FIG. 41, the second molding material (1310) also preferably covers the mandibular edentulous ridge (610). That is, the second molding material (1310) is preferably not only disposed in the periphery of the first mandibular tray base portion (320). This advantageously provides for the equally distributed amount of space for the impression material for the mandibular impressing step (135).

By splitting the posterior molding step (120) and the anterior molding step (130) into separate steps, border molding for the cheek and the lower lip of the patient may be done separately. For example, border molding for the cheek involves pulling the cheek forward, upward, and backward, whereas border molding for the lower lip involves pulling the lower lip upward. By splitting up these two procedures, there is increased control of border molding motions. It is a known problem that when the cheek is being molded, the lower lip may tend to be distorted, and when the lower lip is being molded, the cheek may tend to be distorted.

As shown in FIG. 40, in the posterior molding step (120), preferably, the first molding material (1210) is preferably deposited to both a left side and a right side of the first mandibular tray bottom surface (415), and simultaneously pressed down against the mandibular gum (600) of the patient. This advantageously stabilizes the first mandibular tray (300) during subsequent steps.

The mandibular impressing step (135) is depositing a first impression material (1410) over the first mandibular tray bottom surface (415), the first molding material bottom surface (1215), and/or the second molding material bottom surface (1315), and impressing the mandibular gum (600) of the patient.

Figure 14:
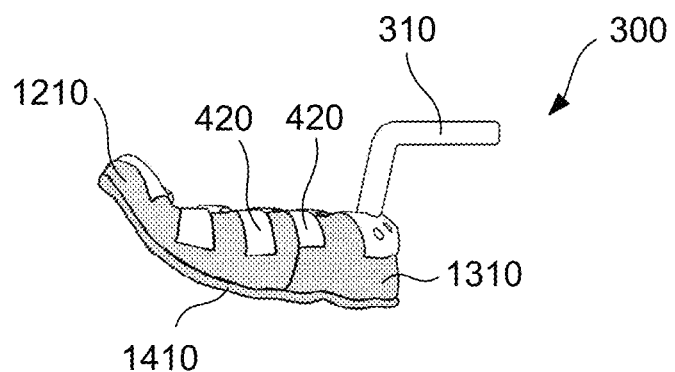
FIG. 14 is a right side view of the first mandibular tray showing a first impression material.
Figure 15:
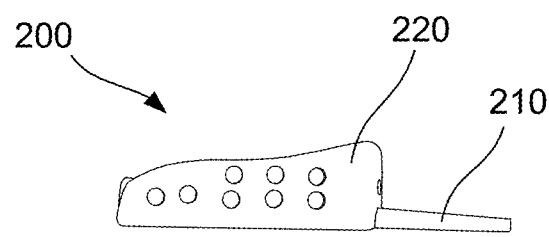
FIG. 15 is a right side view of the first maxillary tray of FIG. 2.
Figure 16:
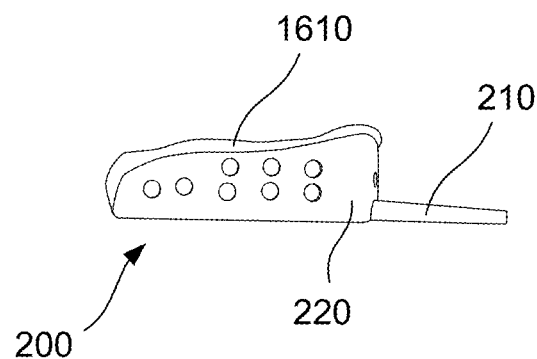
FIG. 16 is the right side view of FIG. 15 showing a second impression material.

As shown in FIG. 14, for example, the first impression material (1410) may be deposited on the first molding material bottom surface (1215) and the second molding material bottom surface (1315). Subsequently, the first impression material (1410) may then be used to impress the mandibular gum (600) of the patient.

Alternatively, such as when the posterior molding step (120) and the anterior molding step (130) are not performed, the first impression material (1410) may be deposited on the first mandibular tray bottom surface (415) (see FIG. 37).

The first maxillary impressing step (140) is depositing a second impression material (1610) over a first maxillary tray top surface (205) and impressing a maxillary gum (not shown) of the patient.

Figure 17:
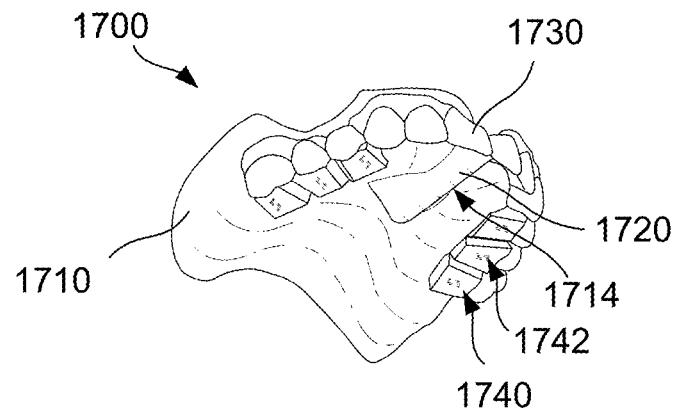
FIG. 17 is a bottom right perspective view of a second maxillary tray.

The tray fabricating step (145) is fabricating a second maxillary tray (1700) and a second mandibular tray (1800) on the basis of the first maxillary impressing step (140) and the mandibular impressing step (135), respectively. As shown in FIG. 17, the second maxillary tray (1700) includes a second maxillary tray base portion (1710) which is contoured to fit either the maxillary gum (not shown) of the patient or impression material to be applied to the maxillary gum (not shown) of the patient.

Figure 24:
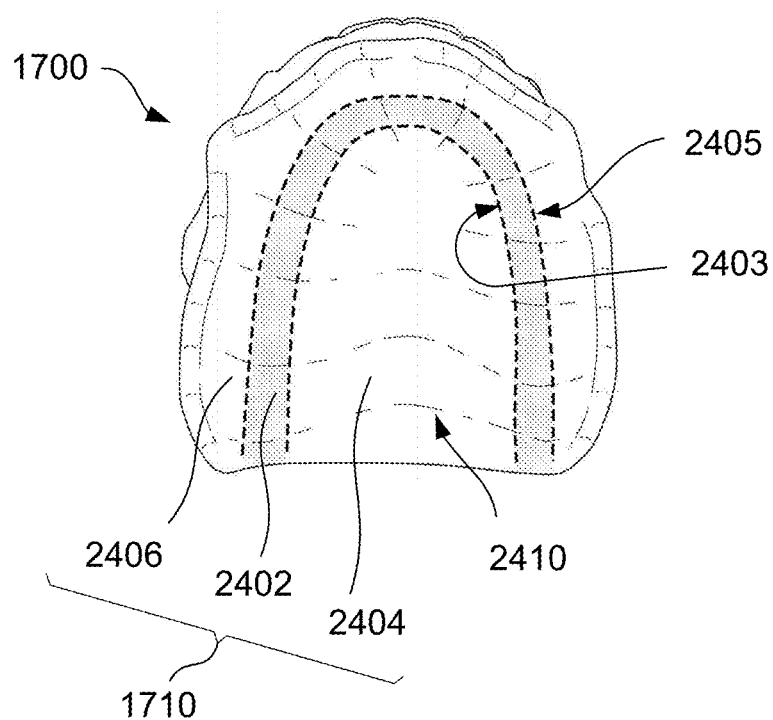
FIG. 24 is a top view of the second maxillary tray showing location of second maxillary tray U shaped portion.

As shown in FIG. 24, the second maxillary tray base portion (1710) may include a second maxillary U shaped portion (2402). The second maxillary U shaped portion is shown as shaded in FIG. 24. The second maxillary U shaped portion includes a second maxillary U shaped portion buccal side (2405) and a second maxillary U shaped portion lingual side (2403).

The second maxillary tray base portion (1710) may further include a second maxillary lingual portion (2404), which upwardly extends from the second maxillary U shaped portion lingual side (2403) with slope of at least 10 degrees in cross sectional view (not shown). The second maxillary tray base portion (1710) may further include a second maxillary buccal portion (2406), which upwardly extends from the second maxillary U shaped portion buccal side (2405) with slope of at least 10 degrees in cross sectional view (not shown).

The second maxillary U shaped portion (2402), the second maxillary lingual portion (2404), and the second maxillary buccal portion (2406) may serve to provide a contour which provides a suitable amount of space for impression material to be applied to the maxillary gum (not shown) of the patient.

Specifically, second maxillary tray base portion (1710) includes a second maxillary base portion top surface (2410). The second maxillary base portion top surface (2410) serves to carry impression material to be applied to the maxillary gum (not shown) of the patient.

Figure 35:
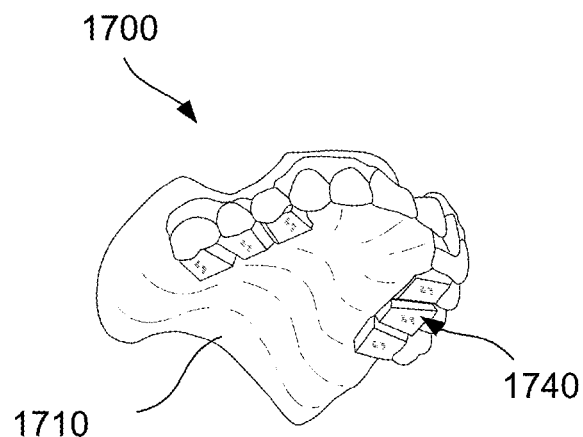
FIG. 35 is a bottom right perspective view of an embodiment of the second maxillary tray with no second maxillary tray contacting portion according to the embodiment of FIG. 17.

Returning now to FIG. 17, it is preferable but not essential that the second maxillary tray (1700) includes a second maxillary tray contacting portion (1720). The second maxillary tray contacting portion (1720) serves to make contact with a contacting surface originating from a lower jaw of the patient. For example, the contacting surface may be a second mandibular tray contacting portion (1820). In FIG. 17, the second maxillary tray contacting portion (1720) is shown as being an anterior-posteriorly extending ridge type (1714). However, the second maxillary tray contacting portion (1720) may also be plate type (2820), pin type (3124), and the like. When the second maxillary tray contacting portion (1720) is pin type (3124), it may include threading (3122) such that the pin type (3124) second maxillary tray contacting portion (1720) is able to move up and down to adjust a vertical dimension of occlusion. As shown in FIG. 35, in some embodiments, the second maxillary tray (1700) may not include the second maxillary tray contacting portion (1720).

As shown in FIG. 17, it is preferable but not essential that the second maxillary tray (1700) includes at least one of the tooth form (1730). The tooth form (1730) serves to allow the patient and/or the clinician to visualize an arrangement of teeth within the mouth of the patient, such that any changes can be easily made if deemed necessary by the patient and/or the clinician. When the tooth form (1730) is, for example, a premolar tooth form or a molar tooth form, the tooth form may include no lingual cusp such that there is increased rotational and/or translational freedom.

As shown in FIG. 17, the second maxillary tray (1700) includes a second maxillary tray bottom surface (1740). The second maxillary tray bottom surface (1740) may include a maxillary bite material accepting portion (1742), which may be, at least in part, substantially planar.

Throughout this description, the term "substantially planar" is defined as a surface having radius of curvature of no more than 10 degrees.

As shown in FIG. 19, following the mandibular impressing step (135), a mandibular model (1900) may be obtained. The mandibular model (1900) may be a physical model or a virtual model. For example, when the mandibular model (1900), is a physical model, the mandibular model (1900) may be poured from the first impression material (1410) using a suitable medium, such as dental stone, resin, silicone material, and the like. For example, when the mandibular model (1900) is a virtual model, the mandibular model (1900) may be digital data representative of at least a portion of the first impression material (1410) and/or digital data representative of at least a portion of a negative of the first impression material (1410).

For example, the mandibular model (1900) (when it is a virtual model) may be obtained by digitizing the first impression material (1410), such as by scanning using any digitizing device, such as an optical scanner, a laser scanner, a computer tomography device, and the like. The mandibular model (1900) (when it is a virtual model) may also be obtained by scanning a physical model obtained by pouring the first impression material (1410) using a suitable material, such as dental stone, resin, silicone, and the like.

The second mandibular tray (1800) includes a second mandibular tray base portion (1810) which is contoured to fit the mandibular gum (600) of the patient. The second mandibular tray (1800) preferably also includes the second mandibular tray contacting portion (1820). The second mandibular tray contacting portion (1820) is configured to make contact with the second maxillary tray contacting portion (1720) when the patient bites down in a centric relation position.

The "centric relation position" is an anatomical position known in the art of dentistry as a relationship of an upper jaw and a lower jaw in a state in which both condyles are in a most superior and anterior position in their fossae, respectively.

Figure 25A:
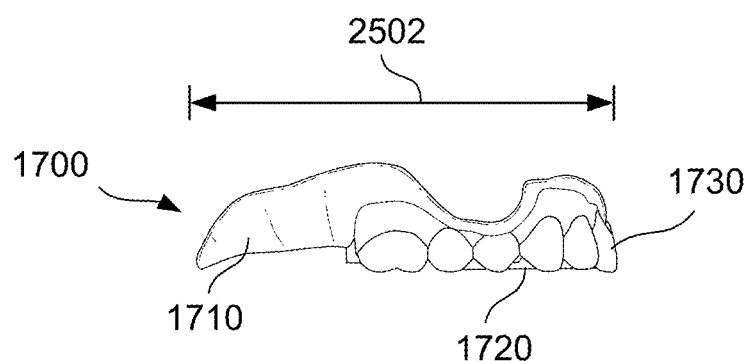
FIG. 25A is a right side view of the second maxillary tray.
Figure 25B:
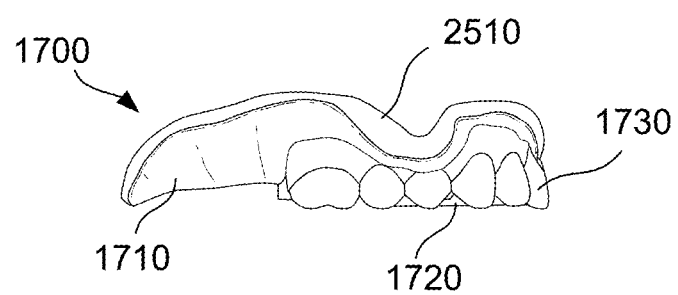
FIG. 25B is the right side view of FIG. 25A showing a third impression material.
Figure 26:
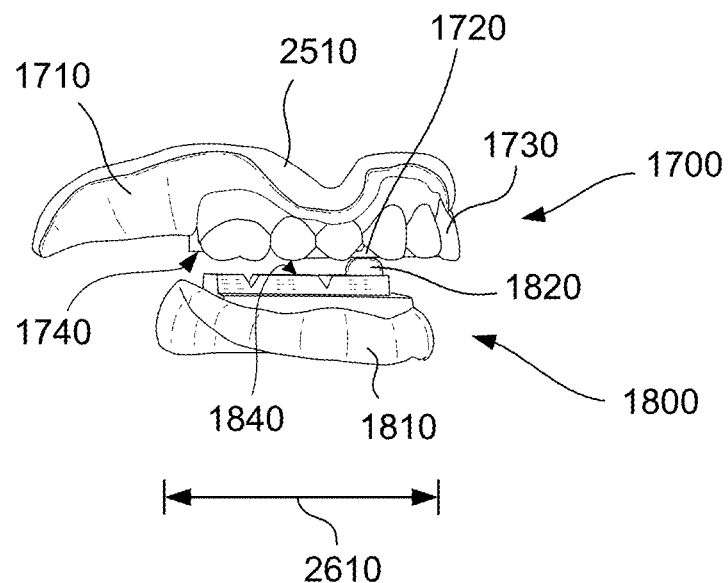
FIG. 26 is the right side view of FIG. 25B showing use with the second mandibular tray.

Referring now to FIG. 25A, the second maxillary tray base portion (1710) includes a second maxillary base portion anterior-posterior length (2502). Referring to FIG. 26, the second mandibular tray base portion (1810) of the second mandibular tray (1800) includes a second mandibular tray base portion anterior-posterior length (2610).

It is preferable but not essential that the second mandibular tray base portion anterior-posterior length (2610) is shorter than the second maxillary base portion anterior-posterior length (2502), more preferably, the second mandibular tray base portion anterior-posterior length (2610) is at least 10 millimeters shorter than the second maxillary base portion anterior-posterior length (2502), and in some implementations, the second mandibular tray base portion anterior-posterior length (2610) may be at least 20 millimeters shorter than the second maxillary base portion anterior-posterior length (2502).

Specifically, since the mandibular retromolar pad (630) is an upwardly extending mass of tissue (from the mandibular edentulous ridge (610)), there is generally little vertical room in a posterior portion of the mouth of the patient. It has been determined that when the second mandibular tray base portion anterior-posterior length (2610) is shorter than the second maxillary base portion anterior-posterior length (2502), there is less chance for the second mandibular tray base portion (1810) to contact the second maxillary tray base portion (1710) when the patient bites down, and more preferably, when the second mandibular tray base portion anterior-posterior length (2610) is at least 10 millimeters shorter than the second maxillary base portion anterior-posterior length (2502), and in some implementations, when the second mandibular tray base portion anterior-posterior length (2610) is at least 20 millimeters shorter than the second maxillary base portion anterior-posterior length (2502), there is an even smaller chance of the second mandibular tray base portion (1810) making contact with the second maxillary tray base portion (1710).

Additionally, it is preferable that the second mandibular tray base portion anterior-posterior length (2610) is shorter than the mandibular ridge length (650). More preferably, the second mandibular tray base portion anterior-posterior length (2610) is at least 10 millimeters shorter than the mandibular ridge length (650). This serves to prevent the second mandibular tray base portion (1810) from making contact with the second maxillary tray base portion (1710).

It is undesirable for the second mandibular tray base portion (1810) to contact the second maxillary tray base portion (1710) because of several reasons. One reason is that the vertical dimension of occlusion (distance between maxillary jaw and mandibular jaw) would then be higher (e.g. higher than would be comfortable for the patient). Another reason is that there would be contact on one side of the mouth of the patient, which is undesirable as opposed to having contact near a center of the mouth of the patient.

As shown in FIG. 26, the second mandibular tray (1800) includes a second mandibular tray bottom surface (2720). Preferably, no impression material is deposited on the second mandibular tray bottom surface (2720). This serves to ensure that the second mandibular tray (1800) will fit back on to the mandibular model (1900). This is also shown in FIG. 21 and FIG. 22, where there is intimate fit between the second mandibular tray (1800) and the mandibular model (1900).

Figure 18:
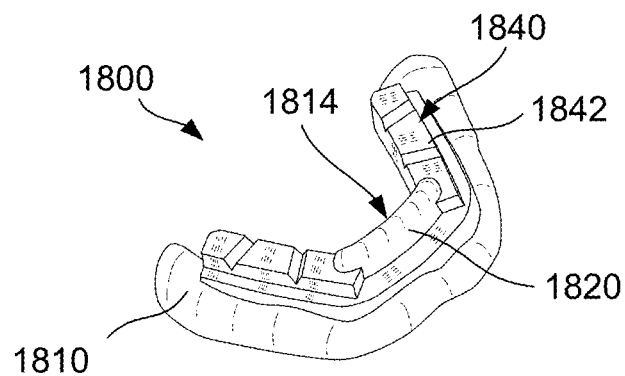
FIG. 18 is a top right perspective view of a second mandibular tray.
Figure 23:
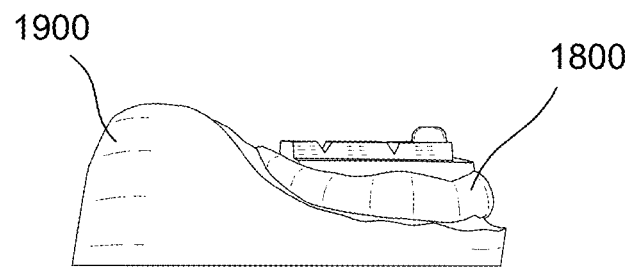
FIG. 23 is a right side view thereof.

In FIG. 18, the second mandibular tray contacting portion (1820) is shown to be a transverse ridge type (1814). The second mandibular tray contacting portion (1820) may also be pin type (2920), plate type (3220), anterior posterior ridge type (3420), and the like. When the second mandibular tray contacting portion (1820) is the pin type (2920), threading (3022) may be included, such that the pin type (2920) second mandibular tray contacting portion (1820) is able to move upwardly or downwardly to change the occlusal vertical dimension as needed.

As shown in FIG. 18, the second mandibular tray (1800) includes a second mandibular tray top surface (1840). The second mandibular tray top surface may include a mandibular bite material accepting portion (1842), which may be, at least in part, substantially planar.

Figure 36:
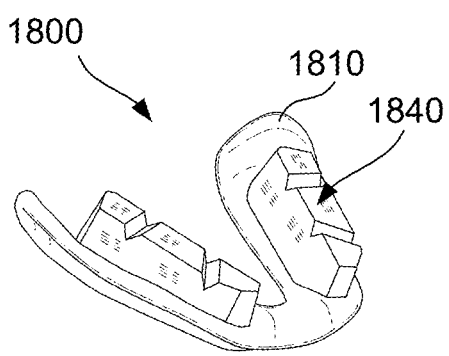
FIG. 36 is a top right perspective view of an embodiment of the second mandibular tray with no second mandibular tray contacting portion according to the embodiment of FIG. 18.

As shown in FIG. 36, in some embodiments, the second mandibular tray (1800) may not include the second mandibular tray contacting portion (1820).

The second maxillary impressing step (150) is depositing a third impression material (2510) over a second maxillary tray top surface (2505) and impressing the maxillary gum (not shown) of the patient.

The third impression material (2510) may be any suitable impression material, such as, for example, silicone impression material, polyether, polysulfide, alginate, and the like.

Importantly, the second maxillary impressing step (150) serves several functions.

First, the second maxillary impressing step (150) allows for a more accurate impression of the maxillary gum of the patient to be obtained. Since the second maxillary tray (1700) is custom made to fit the maxillary gum of the patient, there would be more uniform pressure distributed to the impression material during the second maxillary impressing step (150), leading to a more accurate impression. Also, borders of the second maxillary tray (1700) may be designed to fit the maxillary gum of the patient, such as, for example in maxillary vestibule areas, which is prone to over extension. A border molding procedure may also be conducted during the second maxillary impressing step (150), using any material, such as, for example, silicone impression material or impression compound.

Secondly, following the second maxillary impressing step (150), since the third impression material (2510) after setting would have intimate fit with the maxillary gum of the patient, will lead to the second maxillary tray (1700) to be stable. This would lead to a more accurate jaw registration and occlusal vertical dimension.

It is a major problem in the field of dentistry that maxillary trays used for taking a bite registration is not stable. Oftentimes, denture adhesive needs to be used during bite registration because of how unstable the maxillary trays are. In some implementations, the method described herein alleviates this problem by obtaining the bite registering step (155) following the second maxillary impressing step (150), which allows the second maxillary tray (1700) to be stabilized by the third impression material (2510).

Third, for example, since in some implementations, the second maxillary tray (1700) includes the tooth form (1730), the patient and/or clinician can visualize teeth within the mouth of the patient, in a state in which the second maxillary tray (1700) is made stable by the third impression material (2510).

The bite registering step (155) is depositing a bite registration material (2710) between the second maxillary tray bottom surface (1740) and the second mandibular tray top surface (1840), and having the patient bite down. Any method known in the art may be employed, such as having the patient roll his/her tongue back while biting down.

Figure 27:
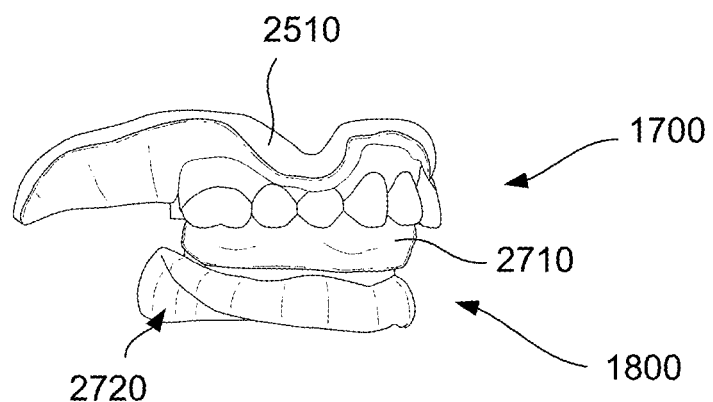
FIG. 27 is the right side view of FIG. 26 showing a bite registration material being deposited between the second maxillary tray and the second mandibular tray.
Figure 28:
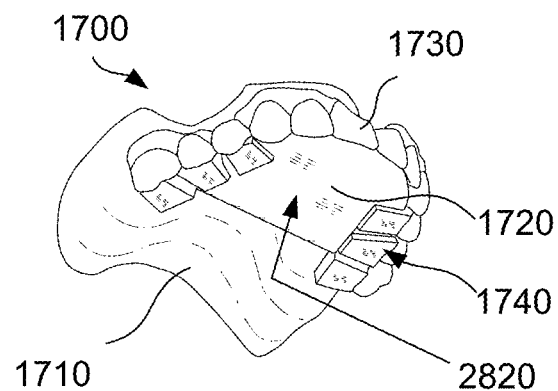
FIG. 28 is a bottom right perspective view of an embodiment of the second maxillary tray with a plate type second maxillary tray contacting portion according to the embodiment of FIG. 17.
Figure 29:
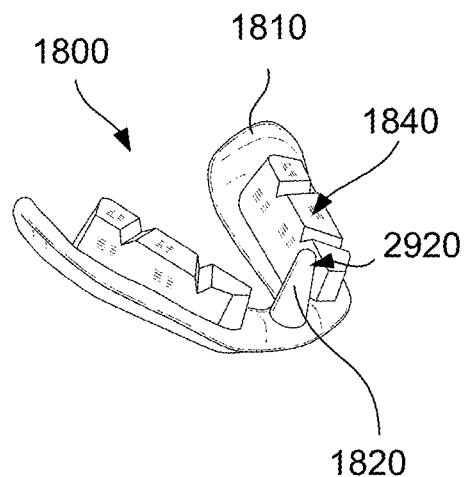
FIG. 29 is a top right perspective view of an embodiment of the second mandibular tray with a pin type second mandibular tray contacting portion according to the embodiment of FIG. 18.
Figure 30:
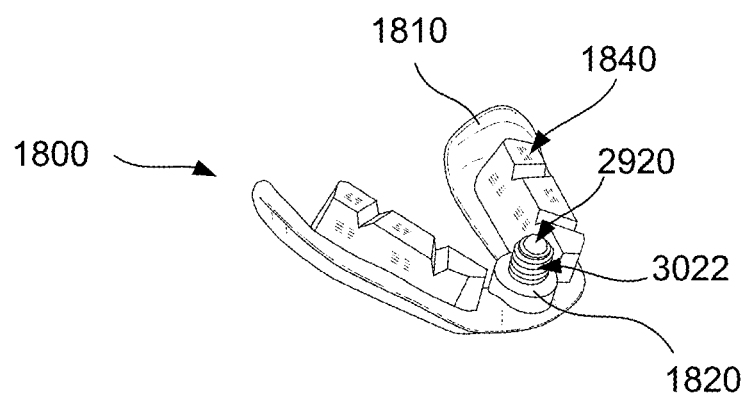
FIG. 30 is a top right perspective view of an embodiment of the second mandibular tray with pin type second mandibular tray contacting portion having threading according to the embodiment of FIG. 29.
Figure 31:
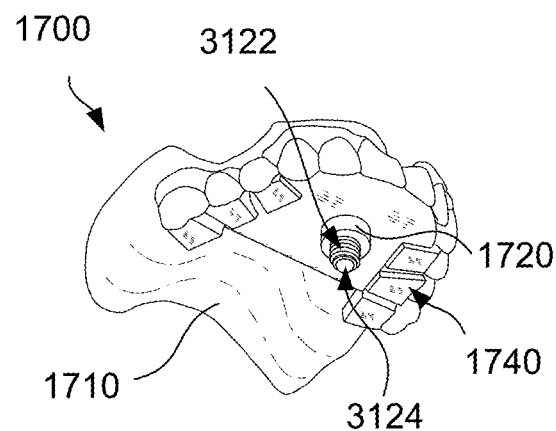
FIG. 31 is a bottom right perspective view of an embodiment of the second maxillary tray with pin type second maxillary tray contacting portion according to the embodiment of FIG. 28.
Figure 32:
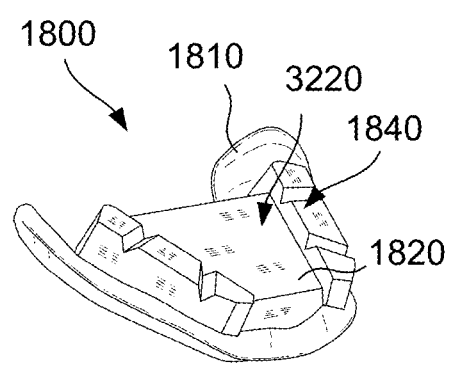
FIG. 32 is a top right perspective view of an embodiment of the second mandibular tray with plate type second mandibular tray contacting portion according to the embodiment of FIG. 18.
Figure 33:
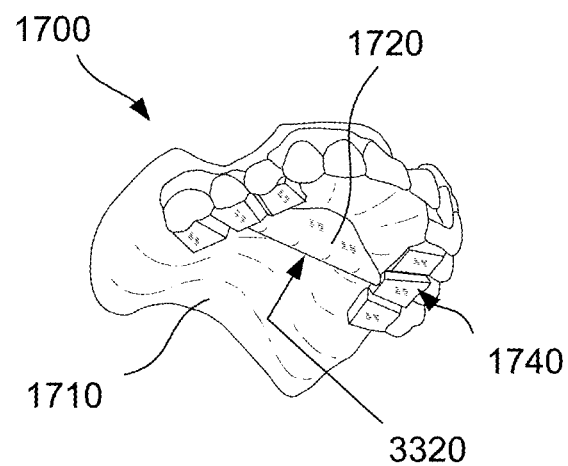
FIG. 33 is a bottom right perspective view of an embodiment of the second maxillary tray with transverse ridge type second maxillary tray contacting portion according to the embodiment of FIG. 17.
Figure 34:
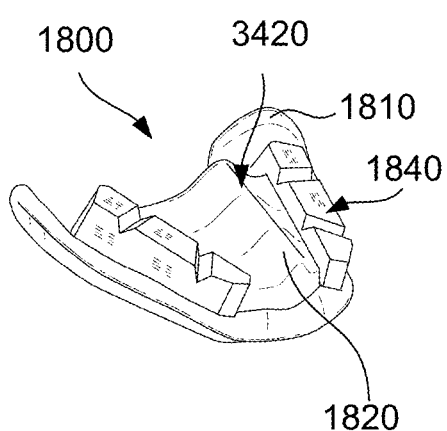
FIG. 34 is a top right perspective view of an embodiment of the second mandibular tray with anterior-posterior ridge type second mandibular tray contacting portion according to the embodiment of FIG. 18.

Importantly, as shown in FIG. 27, preferably, no impression material is deposited on the second mandibular tray bottom surface (2720). This serves several purposes.

First, because no impression material is deposited on the second mandibular tray bottom surface (2720), there would be intimate fit between the second mandibular tray (1800) and the mandibular model (1900). That is, if impression material were to be placed on the second mandibular tray bottom surface (2720), the second mandibular tray (1800) would not be able to fit the mandibular model (1900) (see FIG. 21).

Secondly, because no impression material is deposited on the second mandibular tray bottom surface (2720), there would be less chance of occlusal interference when the patient bites down during the bite registering step (155). That is, since the third impression material (2510) is prone to spilling over to a side of the second maxillary tray (1700) when it is being pushed against the maxillary gum of the patient, this spill over material would be prone to making contact with, for example, impression material to be deposited on the second mandibular tray bottom surface (2720), leading to inaccuracies in bite registration.

Thirdly, because no impression material is deposited on the second mandibular tray bottom surface (2720), the vertical dimension of occlusion would be easier to determine, since impression material would increase the distance between the maxillary gum and the mandibular gum of the patient.

In the bite registering step (155), for example, the bite registration material (2710) may be deposited on the second mandibular tray top surface (1840) in a state in which the second mandibular tray (1800) and the second maxillary tray (1700) are within the mouth of the patient, and having the patient bite down.

The denture fabricating step (160) is fabricating the set of dentures. In the denture fabricating step, the set of dentures may be made using any method, such as packing or computer aided manufacturing. For example, the second maxillary tray (1700) may be poured in stone to obtain a second maxillary model. The second maxillary tray (1700) together with the second maxillary model may be set on a mounting stand on a dental articulator to attach the second maxillary model to the articulator. Denture teeth may then be set according to the mounting stand on the dental articulator.

INDUSTRIAL APPLICABILITY

The invention has application to the dental industry.

What is claimed is:

1. A method for fabricating a set of dentures for a patient, the method comprising the steps of:
providing a first mandibular tray and a first maxillary tray;
depositing a first impression material to a first mandibular tray bottom surface;
pressing the first impression material against a mandibular gum of the patient and setting the first impression material;
depositing a second impression material to a first maxillary tray top surface;
pressing the second impression material against a maxillary gum of the patient and setting the second impression material;

fabricating a second mandibular tray on the basis of the first impression material and fabricating a second maxillary tray on the basis of the second impression material;

depositing a third impression material to a second maxillary tray top surface;

pressing the third impression material against the maxillary gum of the patient and setting the third impression material;

thereafter depositing a bite registration material between a second maxillary tray bottom surface and a second mandibular tray top surface, and having the patient bite down;

fabricating the set of dentures on the basis of the second maxillary tray, the third impression material, the second mandibular tray, and the bite registration material;

wherein no impression material is deposited on a second mandibular tray bottom surface;

disposing a lifting piece over the first mandibular tray bottom surface;

depositing a first molding material over a posterior portion of the first mandibular tray bottom surface and molding the first molding material to the mandibular gum of the patient;

thereafter removing the lifting piece; and depositing a second molding material over an anterior portion of the first mandibular tray bottom surface and molding the second molding material to the mandibular gum of the patient.

2. The method of claim 1, wherein the second maxillary tray comprises at least one tooth form.

3. The method of claim 2, wherein the at least one tooth form is a premolar tooth form, and wherein the at least one tooth form includes no lingual cusp.

4. A method for fabricating a set of dentures for a patient, the method comprising the steps of:

providing a first mandibular tray and a first maxillary tray;

disposing a lifting piece over a first mandibular tray bottom surface;

depositing a first molding material over a posterior portion of the first mandibular tray bottom surface and molding the first molding material to a mandibular gum of the patient;

the first molding material defining a first molding bottom surface;

removing the lifting piece;

depositing a second molding material over an anterior portion of the first mandibular tray bottom surface and molding the second molding material to the mandibular gum of the patient;

the second molding material defining a second molding bottom surface;

depositing a first impression material to at least a portion of the first molding bottom surface and at least a portion of the second molding bottom surface;

pressing the first impression material against the mandibular gum of the patient and setting the first impression material;

depositing a second impression material to a first maxillary tray top surface;

pressing the second impression material against a maxillary gum of the patient and setting the second impression material;

fabricating a second mandibular tray on the basis of the first impression material and fabricating a second maxillary tray on the basis of the second impression material;

depositing a third impression material to a second maxillary tray top surface;

pressing the third impression material against the maxillary gum of the patient and setting the third impression material;

depositing a bite registration material between a second maxillary tray bottom surface and a second mandibular tray top surface, and having the patient bite down;

fabricating the set of dentures on the basis of the second maxillary tray, the third impression material, the second mandibular tray, and the bite registration material; and wherein no impression material is deposited on a second mandibular tray bottom surface.

* * * * *